US008655107B2

(12) United States Patent
Okamoto (10) Patent No.: US 8,655,107 B2
(45) Date of Patent: Feb. 18, 2014

(54) SIGNAL PROCESSING APPARATUS, SIGNAL PROCESSING METHOD, COMPUTER-READABLE MEDIUM AND COMPUTER DATA SIGNAL (75) Inventor: Hitoshi Okamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 653 days.

(21) Appl. No.: 12/463,310

(22) Filed: May 8, 2009

(65) Prior Publication Data
US 2010/0158375 A1 Jun. 24, 2010

(30) Foreign Application Priority Data

Dec. 19, 2008 (JP) ................... P2008-324119

(51) Int. Cl.
*G06K 9/36* (2006.01)
(52) U.S. Cl.
USPC ................... 382/292; 382/218; 382/219
(58) Field of Classification Search
None
See application file for complete search history.

(56) References Cited

U.S. PATENT DOCUMENTS

| 6,043,823 | A | * | 3/2000 | Kodaira et al. | 345/619 |
| 6,088,709 | A | * | 7/2000 | Watanabe | 715/233 |
| 6,751,779 | B1 | * | 6/2004 | Kurosawa et al. | 715/209 |
| 7,409,635 | B2 | * | 8/2008 | Epstein | 715/243 |
| 2005/0105057 | A1 | | 5/2005 | Matsuda et al. | |
| 2008/0159607 | A1 | | 7/2008 | Littmann | |
| 2008/0260260 | A1 | * | 10/2008 | Yamamoto et al. | 382/209 |
| 2008/0310727 | A1 | | 12/2008 | Wu et al. | |
| 2008/0310736 | A1 | * | 12/2008 | Chattopadhyay et al. | 382/218 |

FOREIGN PATENT DOCUMENTS

| CN | 1372674 A | 10/2002 |
| CN | 1601369 A | 3/2005 |
| CN | 101097628 A | 1/2008 |
| CN | 101329766 A | 12/2008 |
| JP | Hei. 5-89190 A | 4/1993 |
| JP | 08-202014 A | 8/1996 |
| JP | 2004-341914 A | 12/2004 |
| WO | 0203314 A1 | 1/2002 |

OTHER PUBLICATIONS

Communication from the Japanese Patent Office dated Oct. 23, 2012, in a counterpart application No. 2008-324119.
Office Action, dated Mar. 7, 2013, issued by the State Intellectual Property Office of the People's Republic of China in counterpart Chinese Application No. 200910137599.2.

* cited by examiner

*Primary Examiner* — Jason M Repko
*Assistant Examiner* — Jhere Rowland
(74) *Attorney, Agent, or Firm* — Sughrue Mion, PLLC (57) ABSTRACT

An image processing apparatus includes an acquiring unit, a specifying unit, a search unit and a difference extracting unit. The acquiring unit acquires a first image and a second image. The specifying unit specifies one or more image areas included in the first image. The search unit searches the second image for an image area corresponding to each of the one or more image areas specified by the specifying unit. The difference extracting unit extracts a difference between the corresponding image area obtained by the search unit and each of the one or more image areas specified by the specifying unit.

12 Claims, 5 Drawing Sheets

SIGNAL PROCESSING APPARATUS, SIGNAL PROCESSING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2008-324119 filed on Dec. 19, 2008.

BACKGROUND

Technical Field

The invention relates to an image processing apparatus, an image processing method, a computer-readable medium and a computer data signal.

SUMMARY

According to an aspect of the invention, an image processing apparatus includes an acquiring unit, a specifying unit, a search unit and a difference extracting unit. The acquiring unit acquires a first image and a second image. The specifying unit specifies one or more image areas included in the first image. The search unit searches the second image for an image area corresponding to each of the one or more image areas specified by the specifying unit. The difference extracting unit extracts a difference between the corresponding image area obtained by the search unit and each of the one or more image areas specified by the specifying unit.

BRIEF DESCRIPTION OF THE DRAWINGS

Exemplary embodiments of the invention will be described below based on the accompanying drawings, wherein.

DETAILED DESCRIPTION

Now, exemplary embodiments of the invention will be described below with reference to the drawings.

Figure 1:
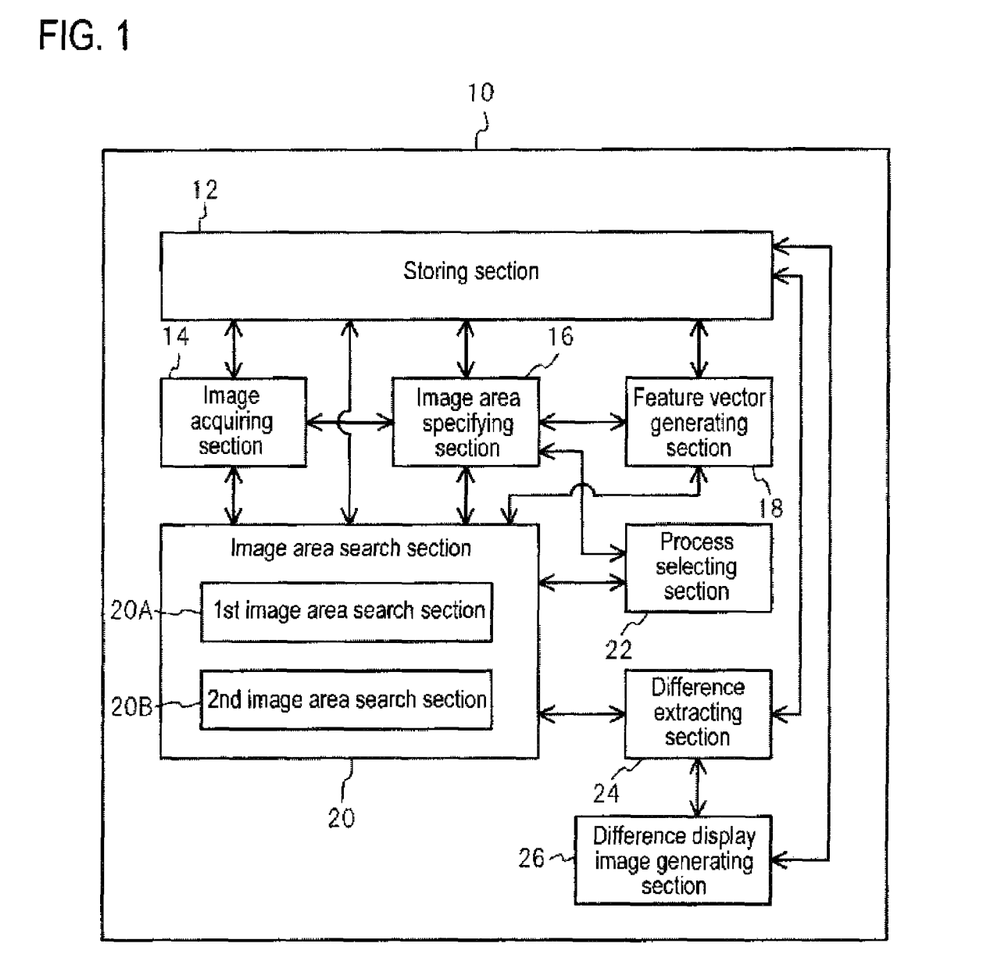
FIG. 1 is a functional block diagram of an image processing apparatus according to an exemplary embodiment.

FIG. 1 shows a functional block diagram of an image processing apparatus 10 according to an exemplary embodiment. As shown in FIG. 1, the image processing apparatus 10 includes a storing section 12, an image acquiring section 14, an image area specifying section 16, a feature vector generating section 18, an image area search section 20, a process selecting section 22, a difference extracting section 24 and a difference display image generating section 26. The functions of the above-described sections may be realized by having a computer read a program stored in a computer-readable medium for execution. The computer includes, for example, a control unit such as a CPU, a storage device such as a memory and an input/output unit for transmitting and receiving data to and from an external device. The program may be supplied to the image processing apparatus 10 as the computer from the information storing medium or may be supplied through a data communication network such the Internet.

The storing section 12 includes a storage device such as a memory or a magnetic disk to store data or a program and is also used as an operation memory for processes (described later) performed by the respective sections.

The image acquiring section 14 acquires plural images to be compared. The image acquiring section 14 may scan a paper document to obtain an image or may receive data input from an external device (a scanner, a digital camera or the like) to obtain an image. The image acquiring section 14 may receive a text file or an electronic document created by application software and then convert the electronic document it into a bitmap format or a format that can be converted into the bitmap format, so as to obtain an image. When the images to be compared are images obtained by the scanner or the digital camera, the image acquiring section 14 may carry out a correction process for aligning an inclination and/a or position of each of the images.

In this exemplary embodiment, it is assumed that the images to be compared are document images including images such as texts, figures or photographs, and that, for the document images, the image acquiring section 14 acquires the document image of an old edition (an edition before revision) and the document image of a new edition (a revised image).

Figure 2A:
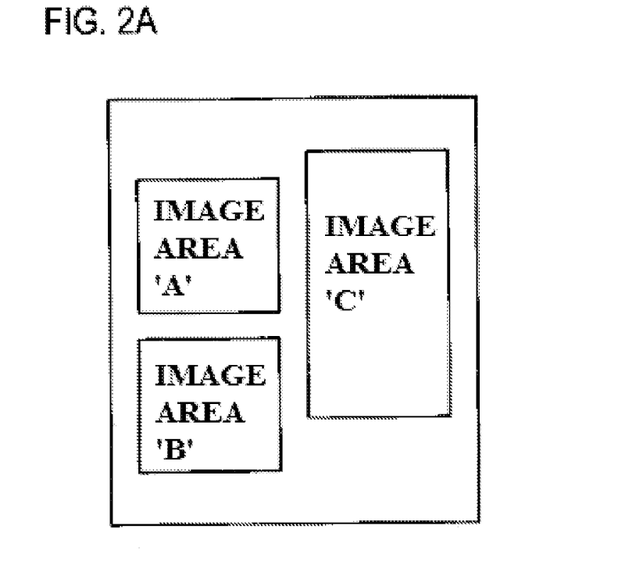
FIG. 2A is a diagram showing one example of an image of an old edition.
Figure 2B:
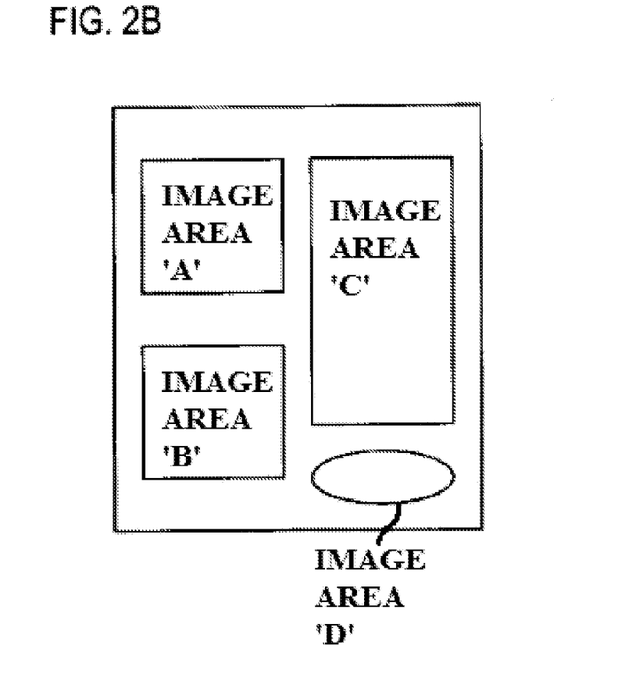
FIG. 2B is a diagram showing one example of an image of a new edition.

FIG. 2A shows one example of the image of the old edition, and FIG. 2B shows one example of the image of the new edition. As shown in FIGS. 2A and 2B, in the image of the new edition, an image area "d" is added to the image of the old edition, and a position an image area "a" (layout of the image area "a") is changed. The image processing apparatus 10 according to this exemplary embodiment determines as to whether or not a difference between the images to be compared is a change in layout, generates difference information between both the images with considering the determination result, and presents the difference information to a user. Now, an example of the specific configuration of the image processing apparatus 10 for carrying out the above-described process will be described below.

The image area specifying section 16 specifies an image area for each image element such as text or a figure included in the image acquired by the image acquiring section 14. Specifically, the image area specifying section 16 binarizes the images, which are to be processed and are acquired by the image acquiring section 14, and specifies a circumscribing rectangular area of each set of connecting pixels in the binarized image obtained by the binarization as an image area for the image element included in the image to be processed. If the format of image information acquired by the image acquiring section 14 is not a bitmap, the image area specifying section 16 may convert the image into the bitmap format and then carry out the above-described process. Then, the image area specifying section 16 stores each specified image area and coordinate information of the each specified image area in the image to be processed in the storing section 12 in association with each other.

The feature vector generating section 18 generates a feature vector for each of the image areas specified by the image area specifying section 16. In this exemplary embodiment, the feature vector generating section 18 extracts plural feature amounts from each specified image area and generates the feature vector by using the extracted feature amounts as elements of the feature vector. As the feature amounts extracted from the image area, for instance, the coordinate of a center (or a center of gravity) of the image area, the vertical and horizontal sizes of the image area, the number of black pixels included in the image area and the length of a line included in the image area may be used. The feature vector generating section 18 generates the feature vectors of the image areas, which are specified in the image of the old edition acquired by the image acquiring section 14, and the feature vectors of the image areas, which are specified in the image of the new edition acquired by the image acquiring section 14. Then, the feature vector generating section 18 stores the generated feature vectors and the image areas in the storing section 12 in association with each other.

The image area search section 20 searches for an image area in one of the two images to be compared (for instance, the image of the old edition) that corresponds to an image area in the other image (for instance, the image of the new edition). For instance, the image area search section 20 selects one of the image areas included in the image of the new edition as a target image area, and searches the image of the old edition for an image area having the same image contents as or similar image contents to the image contents of the selected target image area. If the corresponding image area is fond by the searching operation, the image area search section 20 stores both of the image areas in the storing section 12 in association with each other. If no corresponding image area is found, the image area search section 20 stores information indicating there is no corresponding image area in the storing section 12. In this exemplary embodiment, the image area search section 20 includes a first image area search section 20A and a second image area search section 20B. Either the first image area search section 20A or the second image area search section 20B that is selected by the process selecting section 22 (described below) in accordance with a feature of the image area in one of the images to be compared searches for an image area in the other of the images to be compared. Now, details of the first image area search section 20A and the second image area search section 20B will be described below.

The first image area search section 20A uses the feature vector of the image area in one of the images to be compared to search for the image area, which is in the other of the images to be compared and correspond to the image area in the one of the images to be compared. Specifically, the first image area search section 20A calculates distances (intervector distances) between the feature vector of the target image area included in the image of the new edition and the feature vectors of the image areas included in the image of the old edition to search for an image area, which is included in the image of the old edition and has the minimum distance among the calculated distances as the image area, which is included in the image of the old edition and corresponds to the target image area. If the calculated minimum distance exceeds a predetermined threshold value, the first image area search section 20A may determine that the image of the old edition includes no image area corresponding to the target image area.

The second image area search section 20B searches for the image area, which is in the other image to be compared and corresponds to the target image area in the one of the images to be compared, by a pattern matching method. Specifically, the second image area search section 20B extracts image data of the target image area included in the image of the new edition to compare the extracted image data with image data that is obtained from the image of the old edition by sequentially clipping an image area from the image of the old edition while moving an image area having the same size as that of the target image area over the image of the old edition so as to specify the most similar image area in the image of the old edition to the target image area. However, if a similarity between the target image area and the specified image area falls below a predetermined threshold value or if certain feature amounts of the specified image area and the target image area, for example, coordinates of a center (or a center of gravity) of the specified image area and coordinates of a center (or a center of gravity) of the target image area are outside of a predetermined range, the second image area search section 20B may determine that the image of the old edition includes no image area corresponding to the target image.

The process selecting section 22 selects, based on a feature of the target image area in the one of the images to be compared, whether the image area, which is included in the other of the images to be compared and corresponds to the target image area, is searched for by the first image area search section 20A or the second image area search section 20B. Specifically, the process selecting section 22 acquires vertical and horizontal sizes of the target image area. If the acquired vertical and horizontal sizes are in a predetermined range, the process selecting section 22 determines that the target image area represents a character, and causes the first image area search section 20A to search the image of the old edition for an image area. If the acquired vertical and horizontal sizes are larger than an upper limit of the predetermined range, the process selecting section 22 determines that the target image area represents a figure, and causes the second image area search section 20B to search the image of the old edition for an image area. If the target image area is smaller than the predetermined range, the process selecting section 22 determines that the target image area represents noise and may not carry out a process by the image area search section 20.

As described above, when the process selecting section 22 determines that the target image area represents the figure, the process selecting section 22 selects a search using the feature vector because of the following reasons. In the case of the figure, since the feature of the image area is sufficiently reflected on the feature vector, an image area can be uniquely specified and high search accuracy can be achieved. Further, the search using the feature vector has a higher processing speed than that of a search using the pattern matching process. On the other hand, when the process selecting section 22 determines that the target image area represents the character, the process selecting section 22 selects the search using the pattern matching method, because image features of characters are often similar to each other and the feature of the image area may not be sufficiently reflected on the feature vector. Or, since many image areas having similar feature vectors appear in a narrow range, the search accuracy might be deteriorated.

The difference extracting section 24 extracts a difference between the images to be compared with each other (for example, the image of the old edition and the image of the new edition), which are acquired by the image acquiring section 14. In this exemplary embodiment, if the image area is obtained by the searching of the image area search section 20 for each of the image areas included in the image of the new edition, the difference extracting section 24 extracts a difference between the image area included in the image of the new edition and the image area obtained by the searching of the image area search section 20. If no image area is obtained by the searching of the image area search section 20, the difference extracting section 24 extracts as a difference an image area in which no corresponding image area is obtained by the searching of the image area search section 20. When the difference extracting section 24 extracts the difference between the image areas, the difference extracting section 24 compares image contents of the image areas with each other to extract image difference data and compares positional information (layout information) of the respective image areas in the images with each others to extract difference data between the positional information. The difference extracting section 24 may store the extracted difference data and the image areas in the storing section 12 in association with each other.

The difference display image generating section 26 generates a difference display image that shows the difference between the compared images, based on the difference data extracted by the difference extracting section 24. Now, one example of the difference display image, which shows a difference in the image of the new edition relative to the image of the old edition and which is generated by the difference display image generating section 26.

Figure 3A:
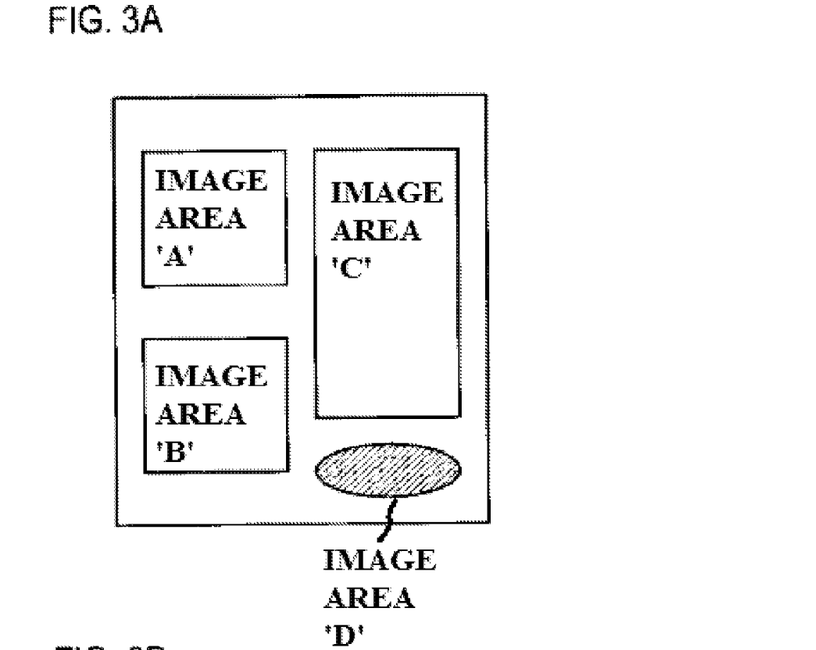
FIG. 3A is a diagram showing one example of a difference display image.

In one example of the difference display image shown in FIG. 3A, a change in layout is not shown as the difference, and only a change in image contents of each image area is displayed as the difference. Specifically, in the image area "a", the layout is changed between the image of the old edition and the image of the new edition. However, this point is not shown as the difference, and only the newly added image area "d" is shown as the difference. When the difference display image generating section 26 generates the difference display image having the above-described contents, the difference display image generating section 26 may generate the difference display image based on the difference data between the images extracted by the difference extracting section 24.

Figure 3B:
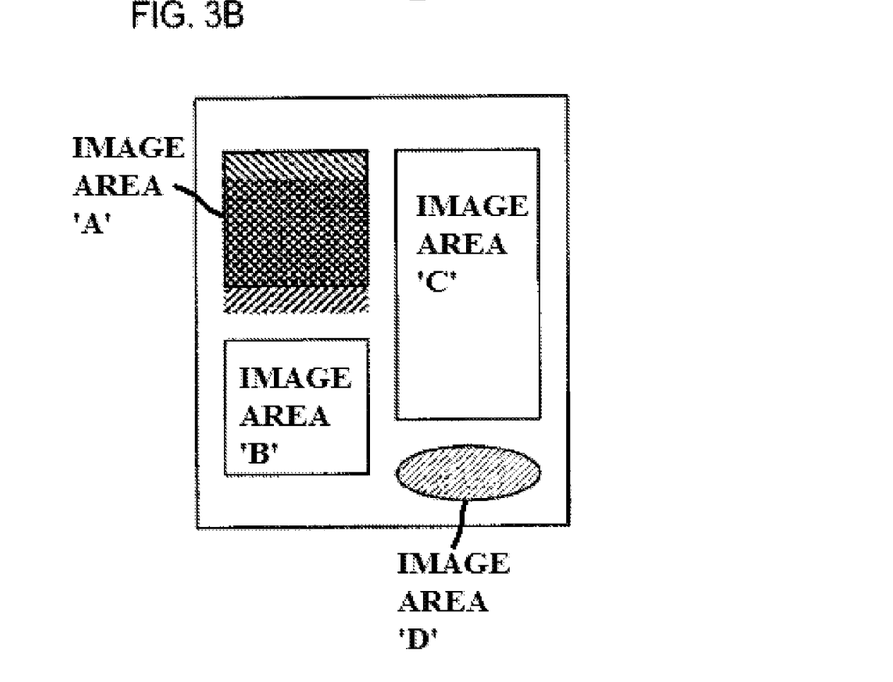
FIG. 3B is a diagram showing one example of a difference display image.

In one example of the difference display image shown in FIG. 3B, both a change in layout and a change in image contents of each image area are displayed as the differences. In the difference display image shown in FIG. 3B, the change in layout in the image area "a" is also shown as the difference. For instance, the image area in which layout has been changed may be formed with different colors from each other to show the change in layout. When the difference display image generating section 26 generates the difference display image having the above-described contents, the difference display image generating section 26 may generate the difference display image based on the difference data between the images and the difference data between the positional information, which are extracted by the difference extracting section 24. Further, when positions of the corresponding image areas in the respective images to be compared are separated more than a predetermined distance, the difference display image generating section 26 may display a change in layout as the difference.

Now, referring to FIGS. 4 and 5, the flow of processes carried out by the image processing apparatus 10 will be described below.

Figure 4:
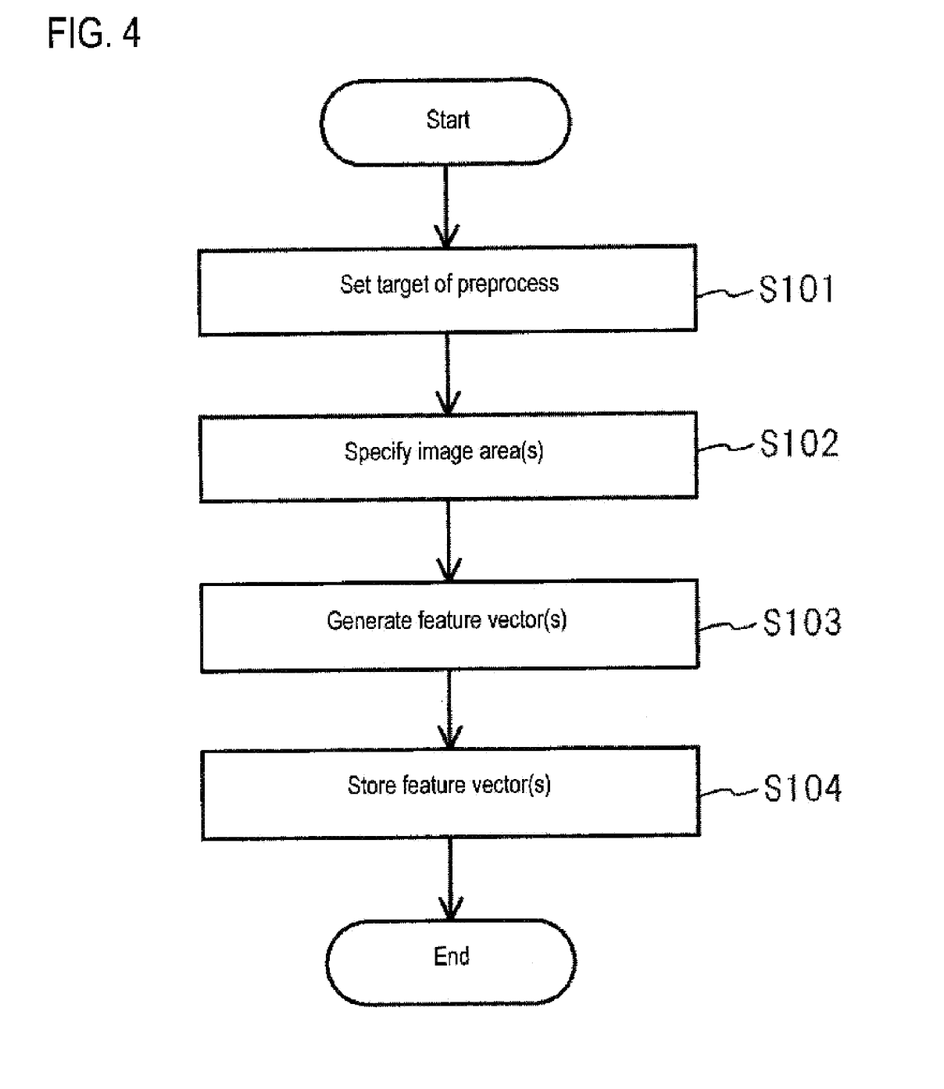
FIG. 4 is a flowchart of a preprocess.

FIG. 4 shows a flowchart of a preprocess carried out by the image processing apparatus 10. As shown in FIG. 4, the image processing apparatus 10 sets one (for instance, the image of the old edition) of the image of the old edition and the image of the new edition, which are to be compared and are acquired by the image acquiring section 14, as a preprocess target (S101) and specifies one or more image areas included in the image set as the preprocess target (S102). The image processing apparatus 10 generates a feature vector including one or more predetermined feature amounts as elements for each specified image areas (S103). The image processing apparatus 10 stores the feature vectors generated for the specified image areas in association with the specified image areas (S104). The preprocess carried out by the image processing apparatus 10 includes the above-described processes.

Figure 5:
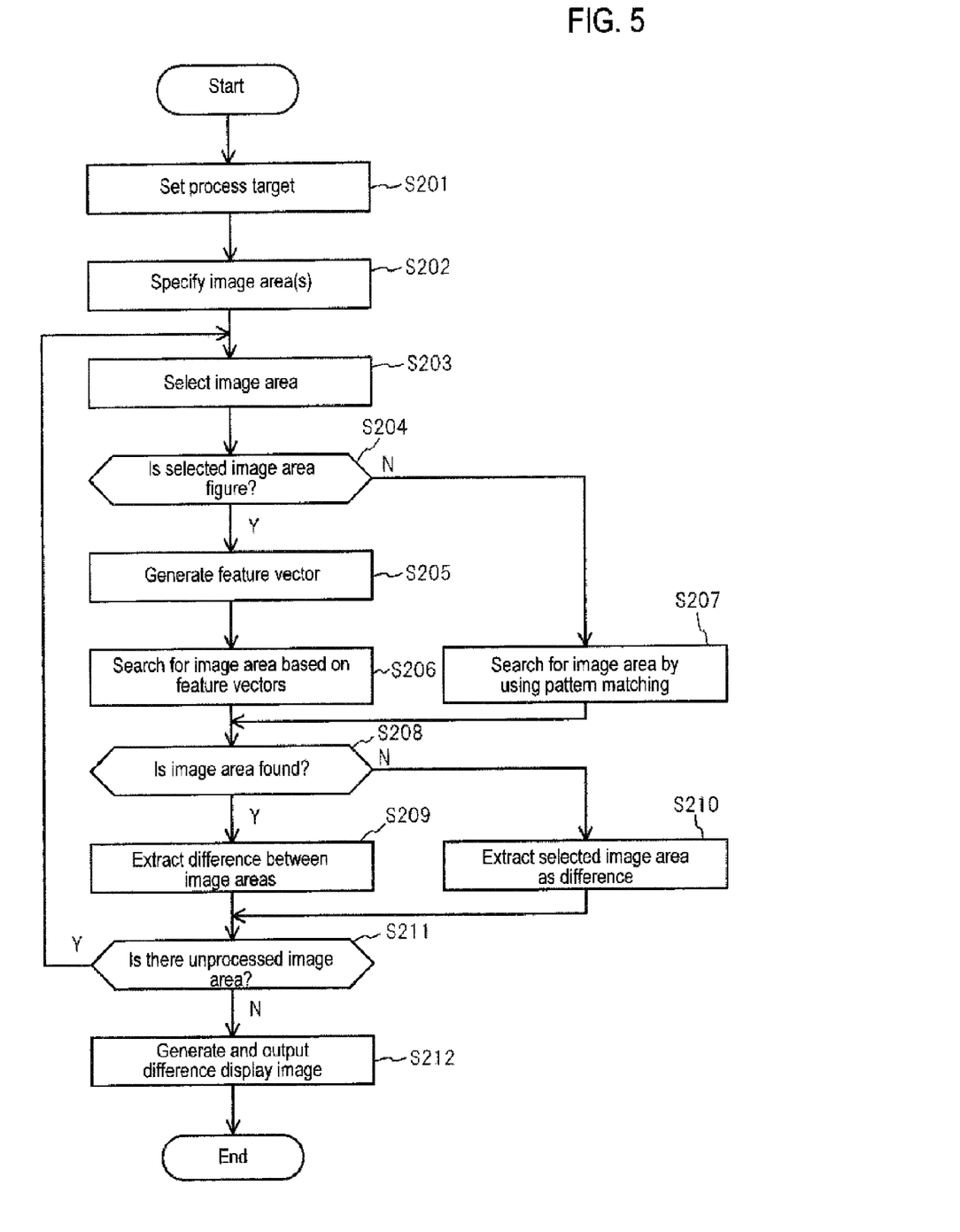
FIG. 5 is a flowchart of a difference image generating process.

FIG. 5 shows a flowchart of a difference image generating process carried out by the image processing apparatus 10. As shown in FIG. 5, the image processing apparatus 10 sets the other (for example, the image of the new edition) of the image of the old edition and the image of the new edition, which are acquired by the image acquiring section 14 and is not set as the preprocess target, as a process target (S201) and specifies one or more image areas included in the image set as the process target (S202). The image processing apparatus 10 selects an image area that has not yet been processed, from the specified image areas (S203). The image processing apparatus 10 determines as to whether or not the selected image area represents a figure based on a feature of the selected image area such as a size of the selected image area (S204).

If the image processing apparatus 10 determines that the selected image area represents a figure (S204:Y), the image processing apparatus 10 generates for the selected image area a feature vector including one or more predetermined feature amounts as elements (S205). Then, the image processing apparatus 10 searches the search target image (for example, the image of the old edition) for an image area corresponding to the selected image area, based on distances between the generated feature vector and the feature vectors, which are previously generated in the preprocess (S206). On the other hand, if the image processing apparatus 10 determines that the selected image area does not represent a figure, namely, represents a character (S204:N), the image processing apparatus 10 carries out a pattern matching process for the selected image area by using respective parts of the search target image to search the search target image for an image area corresponding to the selected image area (S207).

If the image area corresponding to the selected image area is obtained (found) by the above-described process (S208:Y), the image processing apparatus 10 extracts a difference between both the image areas (S209). On the other hand, if the image area corresponding to the selected image area is not obtained (found) by the above-described process (S208:N), the image processing apparatus 10 extracts the selected image area as the difference (S210). Then, the image processing apparatus 10 determines as to whether or not there is an image area that has not yet been processed (S211). If the image processing apparatus 10 determines that there is an image area that has not yet been processed (S211:Y), the image processing apparatus 10 returns to S203 to repeat the subsequent processes. If the image processing apparatus 10 determines that there is no image area that has not yet been processed (S211:N), the image processing apparatus 10 generates a difference display image based on difference information extracted up to that time and outputs the difference display image (S212). The output of the image may be displaying of the difference display image on a display device or printing of the difference display image.

The invention is not limited to the above-described exemplary embodiment. For example, in the above-described exemplary embodiment, during the process of generating the difference display image, it is selected and switched whether or not the image area is searched for by the first image area search section 20A or the second image area search section 20B for each of the specified image areas. However, a search process may be carried out by predetermined one of the first and second image search sections.

Further, in the above-described exemplary embodiment, the image of the old edition is set as the preprocess target and the image of the new edition is set as the target of the difference image generating process. However, they may be reversed. In that case, the image area searched for by the image area search section 20 may be subtracted from the image of the new edition to generate the difference display image.

What is claimed is:

1. An image processing apparatus comprising:
   a processor, the processor including:
      an acquiring unit that acquires a first document and a second document;
      a specifying unit that specifies a first image area among first image areas included in the first document and a second image area among the first image areas;
      a search unit that searches the second document for a first matching image area among second image areas of the second document that most closely matches the first image area and searches the second document for a second matching image area among the second image areas that most closely matches the second image area;
      a difference extracting unit that extracts a difference between the first document and the second document based on search results of the search unit; and
      a generating unit that generates and displays a difference display image showing the difference between the first document and the second document based on the difference extracted by the difference extracting unit,
   wherein the difference comprises a change in position between a first position of the first image area in the first document and a second position of the first matching image area in the second document and a change in content between first content of the second image area in the first image and a second content of the second matching image area,
   wherein the generating unit generates the difference display image to show the change in position in a first formatting and to show the change in content in a second formatting different from the first formatting, the first formatting and the second formatting being visually distinguishable from the first image areas of the first document and second image areas of the second document that are unchanged between the first document and the second document, and
   wherein the difference display image is a single image illustrating an integration of the first document, the second document, the change in position in the first formatting, and the change in content in the second formatting.

2. The image processing apparatus according to claim 1, further comprising:
   a generating unit that generates first feature information for the first image area and the second image area specified by the specifying unit,
   wherein the specifying unit further specifies the second image areas included in the second document, the generating unit further generates second feature information for the second image areas, and the search unit searches the second document for the first matching image area and the second matching image area based on the first feature information and the second feature information.

3. The image processing apparatus according to claim 1, further comprising:
   a generating unit that generates first feature information for the first image area specified by the specifying unit, wherein the specifying unit further specifies the second image areas included in the second image, and the generating unit further generates second feature information for the second image areas,
   wherein the search unit comprises:
      a first search unit that searches the second image areas for the first matching image area, the first matching image area having feature information among the second feature information that is most similar to the first feature information of the first image area; and
      a second search unit that searches the second image areas for the first matching image area, the first matching image area having a second pattern that is most similar to a first pattern of the first image area, and
   wherein the image processing apparatus further comprises:
      a selecting unit that selects, for the first image area, one of the first search unit and the second search unit by which the searching is performed based on vertical and horizontal sizes of the first image area.

4. The image processing apparatus according to claim 1, wherein the difference extracting unit determines the first image area as the difference, when the first matching image area is not obtained by the search unit.

5. The image processing apparatus according to claim 1, wherein the specifying unit binarizes the first document and specifies the first image area in accordance with connected pixels in the binarized first document.

6. The image processing apparatus according to claim 1, wherein the first formatting is a first color and the second formatting is a second color.

7. An image processing method comprising:
   acquiring a first document and a second document;
   specifying a first image area among first image areas included in the first document and a second image area among the first image areas;
   searching the second document for a first matching image area among second image areas of the second document that most closely matches the first image area and searching the second document for a second matching image area among the second image areas that most closely matches the second image area;
   extracting a difference between the first document and the second document based on search results of the search unit;
   generating a difference display image showing the difference between the first document and the second document based on the difference extracted by the difference extracting unit; and
   displaying the difference display image,
   wherein the difference comprises a change in position between a first position of the first image area in the first document and a second position of the first matching image area in the second document and a change in content between first content of the second image area in the first image and a second content of the second matching image area,
   wherein the difference display image shows the change in position in a first formatting and the change in content in a second formatting different from the first formatting, the first formatting and the second formatting being visually distinguishable from the first image areas of the first document and second image areas of the second document that are unchanged between the first document and the second document, and
   wherein the difference display image is a single image illustrating an integration of the first document, the second document, the change in position in the first formatting, and the change in content in the second formatting.

8. The image processing method according to claim 7, further comprising:

generating first feature information for the first image area and the second image area, wherein the specifying comprises specifying the second image areas included in the second image, wherein the generating comprises generating second feature information for the second image areas, and wherein the searching comprises searching the second image for the first matching image area and the second matching image area based on the first feature information and the second feature information.

9. The image processing method according to claim 7, further comprising:

generating feature information for the first image area, wherein the specifying comprises specifying the second image areas included in the second image, wherein the generating comprises generating second feature information for the second image areas, wherein the searching comprises:

searching the second image areas for the first matching image area, the first matching image area having feature information among the second feature information that is most similar to the first feature information of the first image area; and searching the second image areas for the first matching image area, the first matching image area having a second pattern that is most similar to a first pattern of the first image area, and wherein the image processing method further comprises:

selecting, for the first image area, one of searching by feature information and searching by pattern based on vertical and horizontal sizes of the first image.

10. The image processing method according to claim 7, wherein the extracting comprises determining the first image area as the difference, when the first matching image area is not obtained by the searching.

11. The image processing method according to claim 7, wherein the specifying comprises:

binarizing the first document; and specifying the first image area in accordance with connected pixels in the binarized first document.

12. A non-transitory computer-readable medium storing a program that causes a computer to execute image processing, the image processing comprising:

acquiring a first document and a second document;

specifying a first image area among first image areas included in the first document and a second image area among the first image areas;

searching the second document for a first matching image area among second image areas of the second document that most closely matches the first image area and searching the second document for a second matching image area among the second image areas that most closely matches the second image area;

extracting a difference between the first document and the second document based on search results of the search unit;

generating a difference display image showing the difference between the first document and the second document based on the difference extracted by the difference extracting unit; and displaying the difference display image, wherein the difference comprises a change in position between a first position of the first image area in the first document and a second position of the first matching image area in the second document and a change in content between first content of the second image area in the first image and a second content of the second matching image area, wherein the difference display image shows the change in position in a first formatting and the change in content in a second formatting different from the first formatting, the first formatting and the second formatting being visually distinguishable from the first image areas of the first document and second image areas of the second document that are unchanged between the first document and the second document, and wherein the difference display image is a single image illustrating an integration of the first document, the second document, the change in position in the first formatting, and the change in content in the second formatting.

* * * * *